United States Patent
Simnioniw et al.

(10) Patent No.: US 10,029,924 B2
(45) Date of Patent: Jul. 24, 2018

(54) METHOD AND APPARATUS FOR TREATING POTABLE WATER IN MUNICIPAL AND SIMILAR WATER TANKS

(71) Applicant: Medora Environmental, Inc., Dickinson, ND (US)

(72) Inventors: Corey M. Simnioniw, Belfield, ND (US); Jonathan L. Zent, Dickinson, ND (US); Willard R. Tormaschy, Dickinson, ND (US); Joel J. Bleth, Dickinson, ND (US); Gary A. Kudrna, Dickinson, ND (US); Douglas P. Walter, Dickinson, ND (US)

(73) Assignee: Medora Environmental, Inc., Dickinson, ND (US)

( * ) Notice: Subject to any disclaimer, the term of this patent is extended or adjusted under 35 U.S.C. 154(b) by 526 days.

(21) Appl. No.: 13/763,379

(22) Filed: Feb. 8, 2013

(65) Prior Publication Data

US 2014/0224747 A1    Aug. 14, 2014

(51) Int. Cl.
*C02F 1/20* (2006.01)
*B01F 13/00* (2006.01)
(Continued)

(52) U.S. Cl.
CPC ............ *C02F 1/20* (2013.01); *B01D 19/0047* (2013.01); *B01F 3/04737* (2013.01);
(Continued)

(58) Field of Classification Search
CPC .. C02F 1/20; C02F 2101/36; C02F 2101/322; C02F 3/1294; C02F 3/16; C02F 3/165;
(Continued)

(56) References Cited

U.S. PATENT DOCUMENTS 3,278,170 A * 10/1966 Moritz ............... B01F 3/04539
                                                    261/123
3,653,182 A *  4/1972 Welch ................ B01F 3/04049
                                                    261/116
(Continued)

FOREIGN PATENT DOCUMENTS

FR            2076672 A5 * 10/1971 ............ B01F 3/0473

*Primary Examiner* — Lucas Stelling
*Assistant Examiner* — Angel Olivera
(74) *Attorney, Agent, or Firm* — W. Scott Carson

(57) ABSTRACT

Method and apparatus for treating potable water in municipal and similar tanks to reduce and remove undesirable disinfectant byproducts such as trihalomethanes from the water by providing a water circulation system to create circulation patterns in the tank water and an air flow system for creating an air flow pattern in the headspace region of the enclosed tank above the water surface. In operation, a portion of the tank water is drawn-up a draft tube from the tank floor to above the water surface and sprayed through a nozzle outwardly about a vertical axis and slightly downwardly toward the surface of remaining tank water. The air flow system creates and directs a high volume of air through the tank above the water surface to volatize undesirable trihalomethanes in the drawn-up water portion to gaseous state to enter the air flow pattern and exit the tank into ambient air.

18 Claims, 12 Drawing Sheets

(51) Int. Cl.
*B01F 3/04* (2006.01)
*B01D 19/00* (2006.01)
*E03B 11/10* (2006.01)
*F04B 23/02* (2006.01)
*C02F 101/32* (2006.01)
*C02F 101/36* (2006.01)

(52) U.S. Cl.
CPC .......... *B01F 13/0049* (2013.01); *B01D 19/00* (2013.01); *B01D 19/0005* (2013.01); *B01D 19/0042* (2013.01); *B01F 2215/0422* (2013.01); *B01F 2215/0431* (2013.01); *C02F 2101/322* (2013.01); *C02F 2101/36* (2013.01); *C02F 2303/18* (2013.01); *C02F 2303/185* (2013.01); *E03B 11/10* (2013.01); *F04B 23/021* (2013.01)

(58) Field of Classification Search
CPC ...... C02F 3/205; C02F 3/301; B01D 19/0047; B01D 19/00; B01D 19/0042; B01D 19/0005; B01F 3/04737; B01F 13/0049; B01F 2215/0422; B01F 3/0473; B01F 3/04609; B01F 2003/0468; B01F 2215/0431; B01F 3/04758; B01F 5/02; B01F 3/04744; B01F 3/0876; B01F 5/10; B01F 2015/00597; B01F 2015/0052; B01F 3/04773; B01F 7/00341; B01F 7/00591; B01F 7/00733; B01F 7/16
See application file for complete search history.

(56) References Cited

U.S. PATENT DOCUMENTS

| | | | | |
|---|---|---|---|---|
| 4,358,413 | A * | 11/1982 | Brucker | B01F 3/04773 210/242.2 |
| 5,061,302 | A * | 10/1991 | Zuback | B01D 19/0005 95/266 |
| 5,510,022 | A * | 4/1996 | Mullis | B01F 3/04773 210/170.06 |
| 6,390,391 | B1 * | 5/2002 | Ulin | B05B 1/18 239/16 |
| 7,285,208 | B2 | 10/2007 | Tormaschy | |
| 7,332,074 | B2 | 2/2008 | Tormaschy | |
| 7,789,553 | B2 | 9/2010 | Tormaschy | |
| 7,850,433 | B2 | 12/2010 | Tormaschy | |
| 7,906,017 | B2 | 3/2011 | Tormaschy | |
| 8,057,091 | B2 | 11/2011 | Tormaschy | |
| 2003/0011082 | A1 * | 1/2003 | Tanabe | B01F 3/04773 261/91 |
| 2012/0067799 | A1 | 3/2012 | Simnioniw | |

* cited by examiner

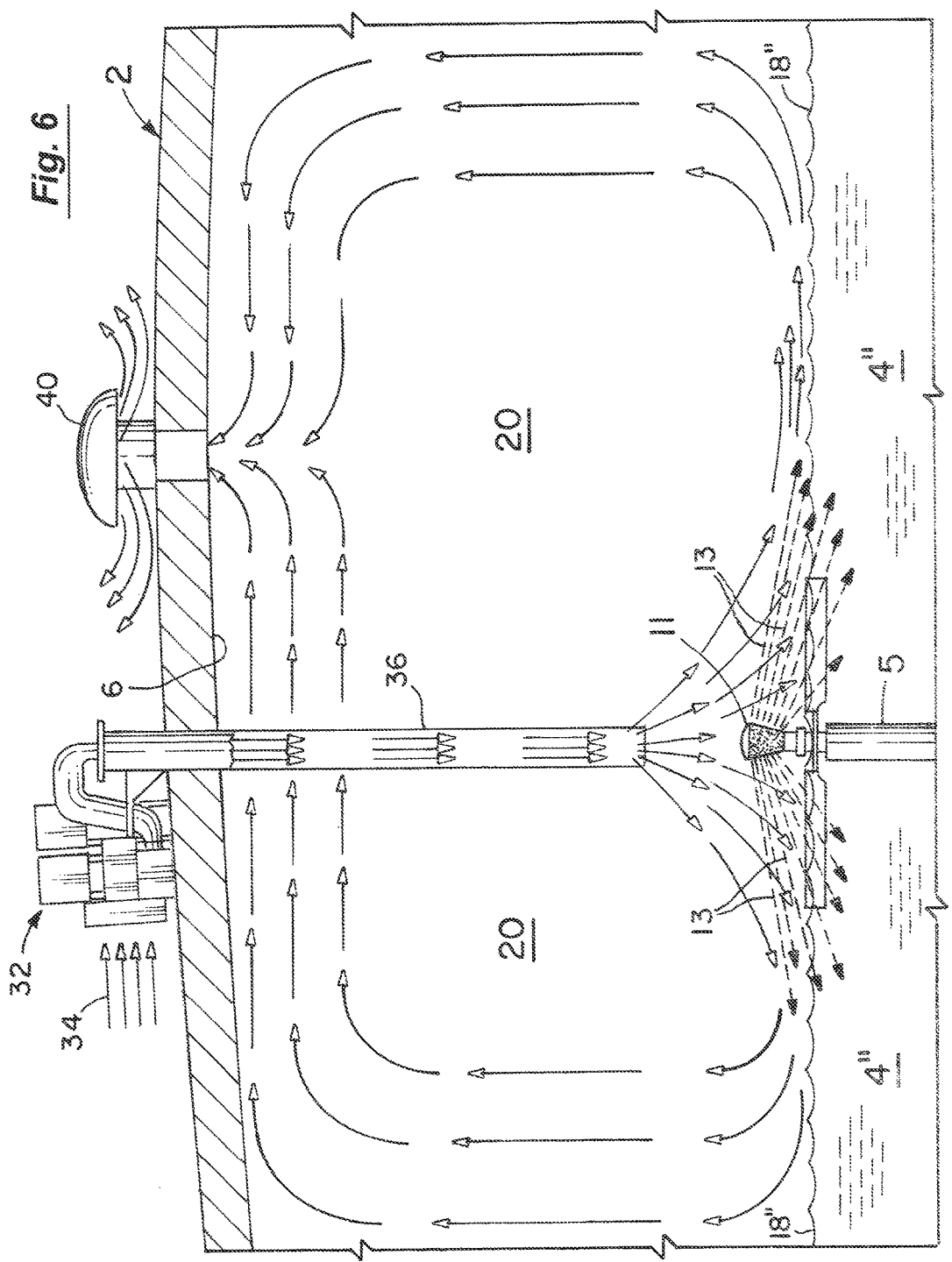

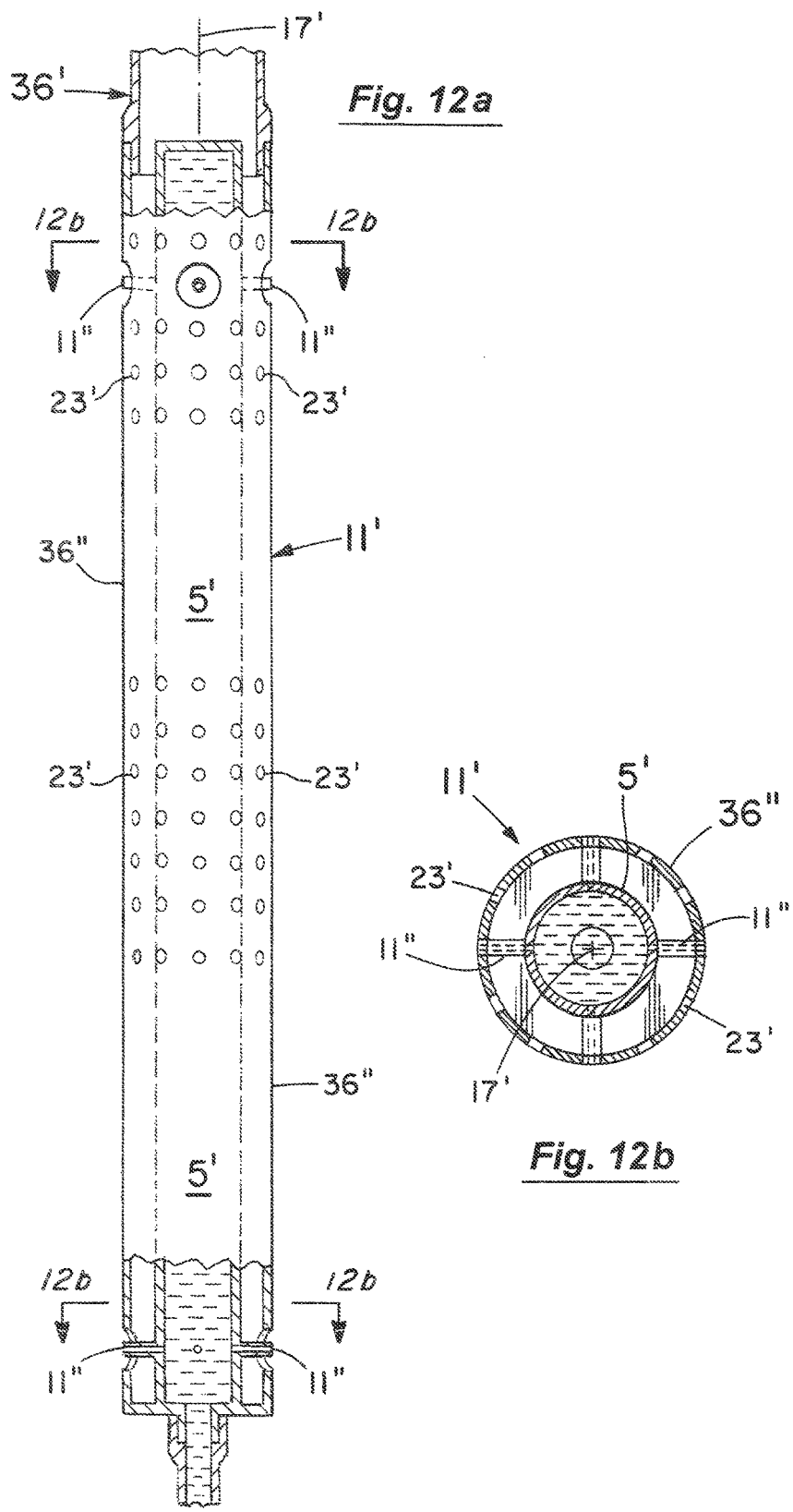

METHOD AND APPARATUS FOR TREATING POTABLE WATER IN MUNICIPAL AND SIMILAR WATER TANKS

BACKGROUND OF THE INVENTION

1. Field of the Invention

This invention relates to the field of systems for treating potable water in municipal and similar tanks to reduce and remove undesirable disinfectant byproducts from the water.

2. Discussion of the Background

Potable bodies of water and in particular municipal and other water sources intended for drinking are commonly treated with disinfectants such as chlorine and chloramines. These disinfectants very efficiently and effectively eliminate harmful agents in the water making the water potable and suitable for drinking. However, such disinfectants can and usually do create undesirable disinfectant byproducts such as chloroform, bromodichloromethane, dibromochloromethane, and bromoform which are all forms of trihalomethanes (THM's). In very small amounts (e.g., very low parts per billion), these THM's are not believed to be a serious threat to health but reduction of them in potable water reservoirs such as municipal water tanks is always desirable and is increasingly being mandated by law.

With this and other problems in mind, the present invention was developed. In it, a water circulation system and an air flow system are each created within an enclosed tank to interact and intersect with each other to greatly enhance the volatizing of undesirable disinfectant byproducts such as THM's in liquid state in the water to gaseous state to then be vented out of the tank.

SUMMARY OF THE INVENTION

This invention involves a method and apparatus for treating potable water in municipal and similar tanks to reduce and remove undesirable disinfectant byproducts such as trihalomethanes from the water. The method and apparatus include providing a water circulation system to create a circulation pattern in the tank water and an air flow system for creating an air flow pattern in the air gap or headspace region of the enclosed tank above the water surface.

In operation, a portion of the tank water is drawn-up a draft tube from essentially at the tank floor to a first location above the water surface. In the preferred embodiment, the drawn-up water portion is then sprayed through a nozzle at the first location outwardly about a vertical axis and slightly downwardly toward the surface of the remaining water in the tank. In doing so, a driving pattern is established in the remaining water in the tank that initially moves radially outwardly from the nozzle toward the tank side walls, downwardly along the side walls, radially inwardly across the tank floor toward the inlet of the draft tube, and up the draft tube to the nozzle. This driving pattern in turn induces a secondary circulation pattern within it to very effectively and thoroughly mix or blend all of the water in the entire tank.

The air flow system in turn creates a high volume of air passing into and out of the tank in the air gap or headspace region above the water surface. The air flow system of the preferred embodiment drives ambient air through a tank inlet downwardly toward the water surface with at least a portion of the air flow pattern directed toward and into the spray pattern of the nozzle. The undesirable trihalomethanes in liquid state in the drawn-up water portion are then exposed in the spray pattern to air and volatize to gaseous state where they enter the air flow pattern and exit the tank through the tank outlet into ambient air. Other portions of the air in the flow pattern passing across the surface of the tank water also aid in volatizing the undesirable trihalomethanes.

BRIEF DESCRIPTION OF THE DRAWINGS

FIG. 6 is a cross-sectional view of the water circulation system and the air flow circulation system of the present invention in operation.

FIGS. 12a and 12b are further enlarged views of the nozzle of the second embodiment.

DETAILED DESCRIPTION OF THE INVENTION

Figure 1:
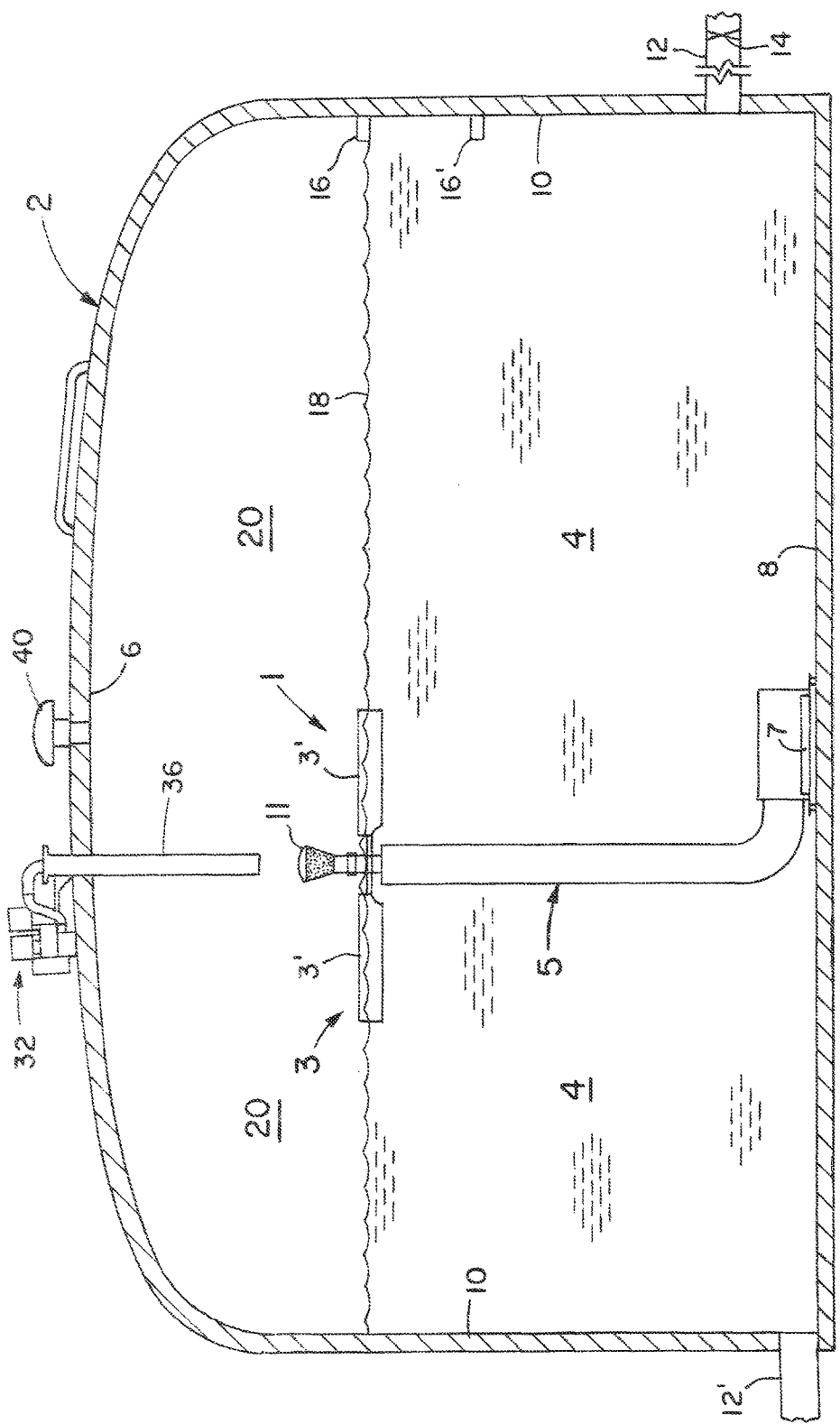
FIG. 1 is a cross-sectional view of a municipal tank with the preferred embodiment of the present invention in it.

The method and apparatus of the present invention are primarily designed for use in a municipal or similar, potable water tanks such as 2 in FIG. 1 to aid in removing undesirable byproducts of the disinfectant process or processes from the water 4. Such undesirable byproducts as discussed above include trihalomethanes (THM) and similar byproducts of disinfecting processes, particularly those processes using chlorine and chloramines which routinely result in undesirable concentrations of THM in liquid state remaining in the processed water. As shown in FIG. 1, municipal water tanks such as 2 commonly include a ceiling 6 and floor 8 with side walls 10 extending therebetween to contain the water 4 in the tank 2. The water 4 can enter and exit the enclosed tank 2 in any number of manners including via the illustrated inlet and outlet pipes 12,12' of FIG. 1. The entering flow through inlet pipe 12 is typically controlled as for example by an upstream valve or pump at 14 that can be selectively operated in response to high and low water level sensors such as 16,16' in the tank 2. The surface 18 of the water 4 is then spaced at least a first distance (e.g., 4 to 6 feet) below the ceiling 6 by the high level sensor 16 to create an air gap or headspace region 20 above the surface 18 of the water 4.

Figure 2:
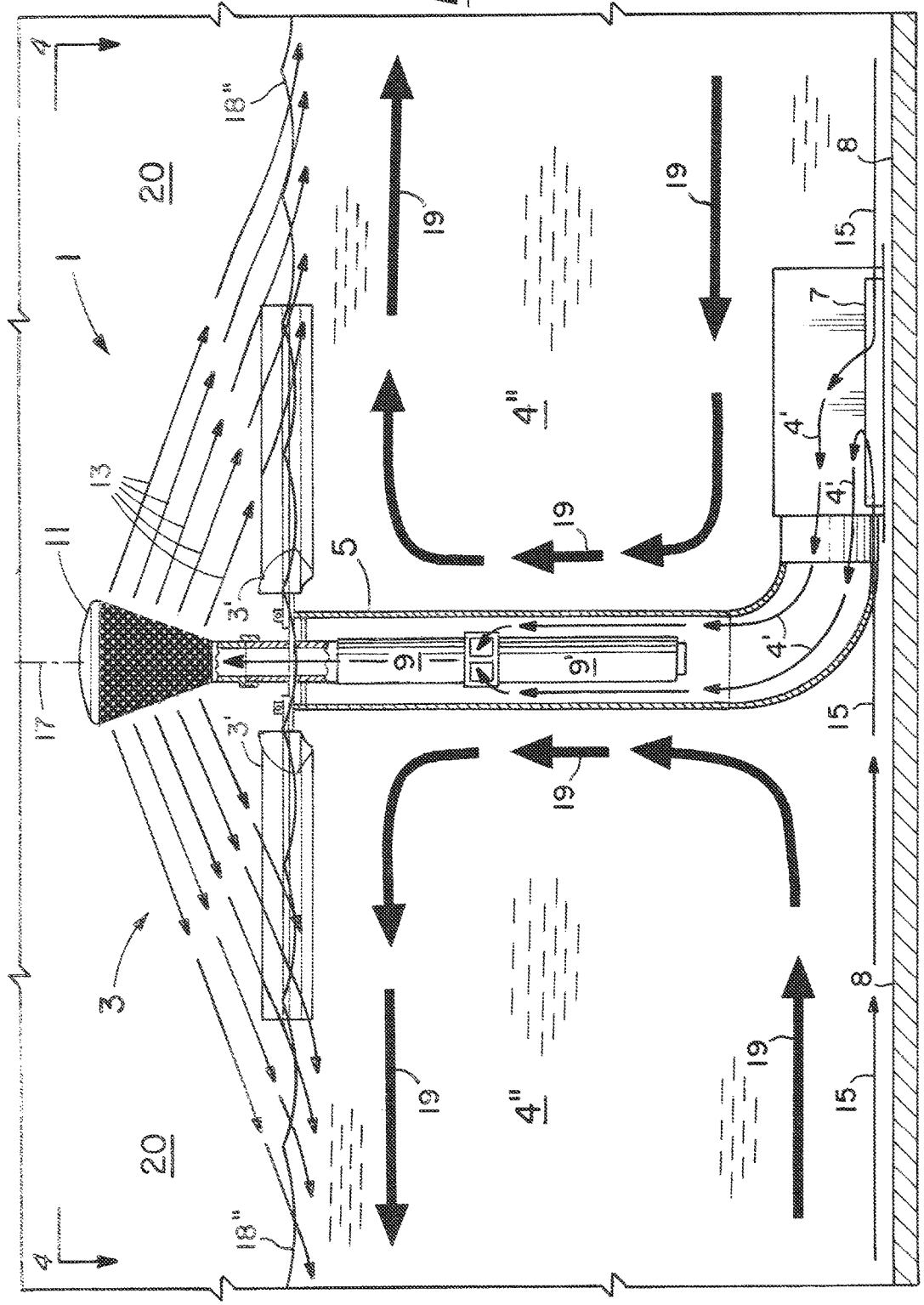
FIGS. 2 and 3 illustrate the outer, driving and inner, induced circulation patterns set up in the tank by the water circulation system of the present invention.
Figure 3:
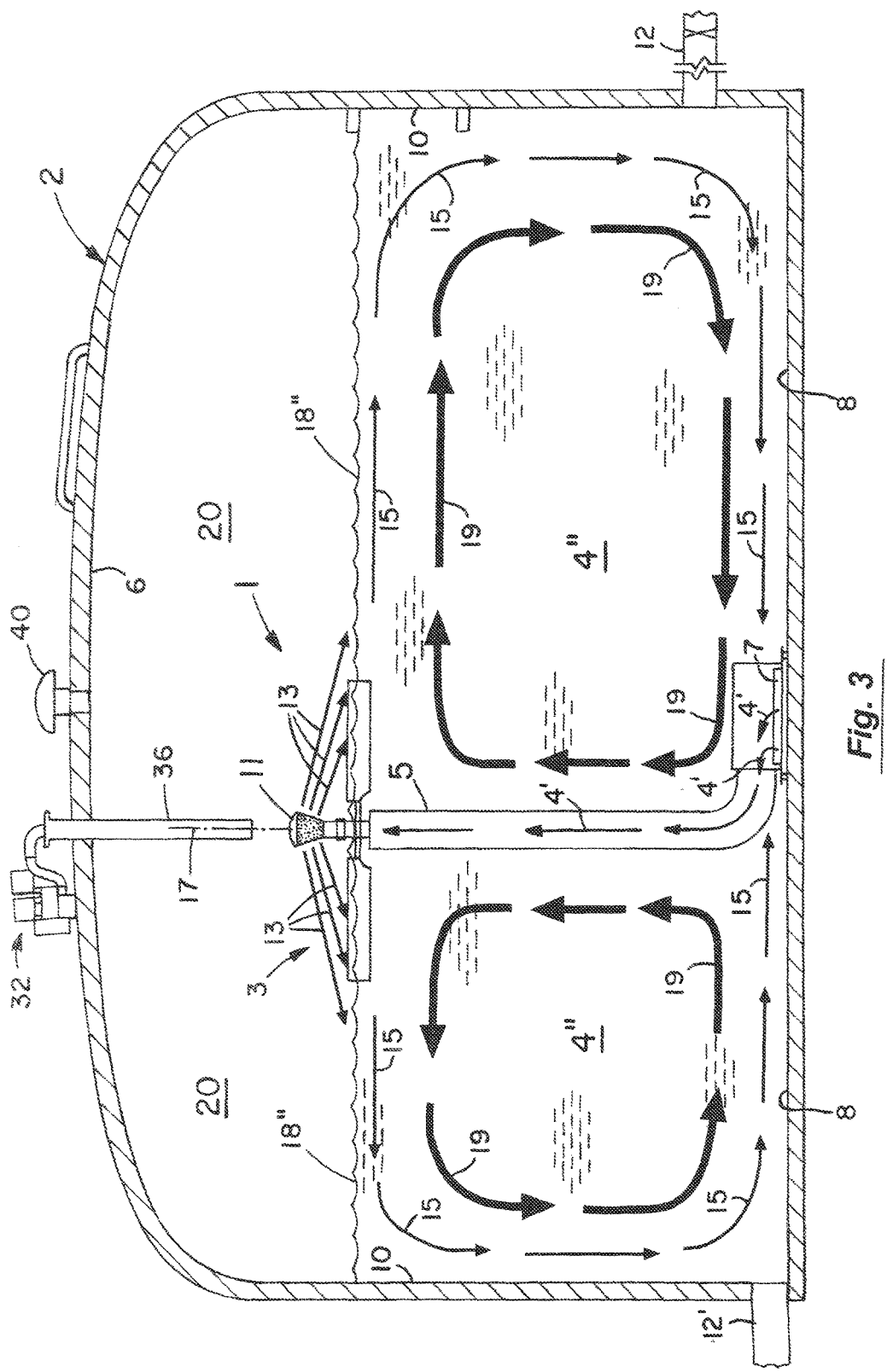
Figure 4:
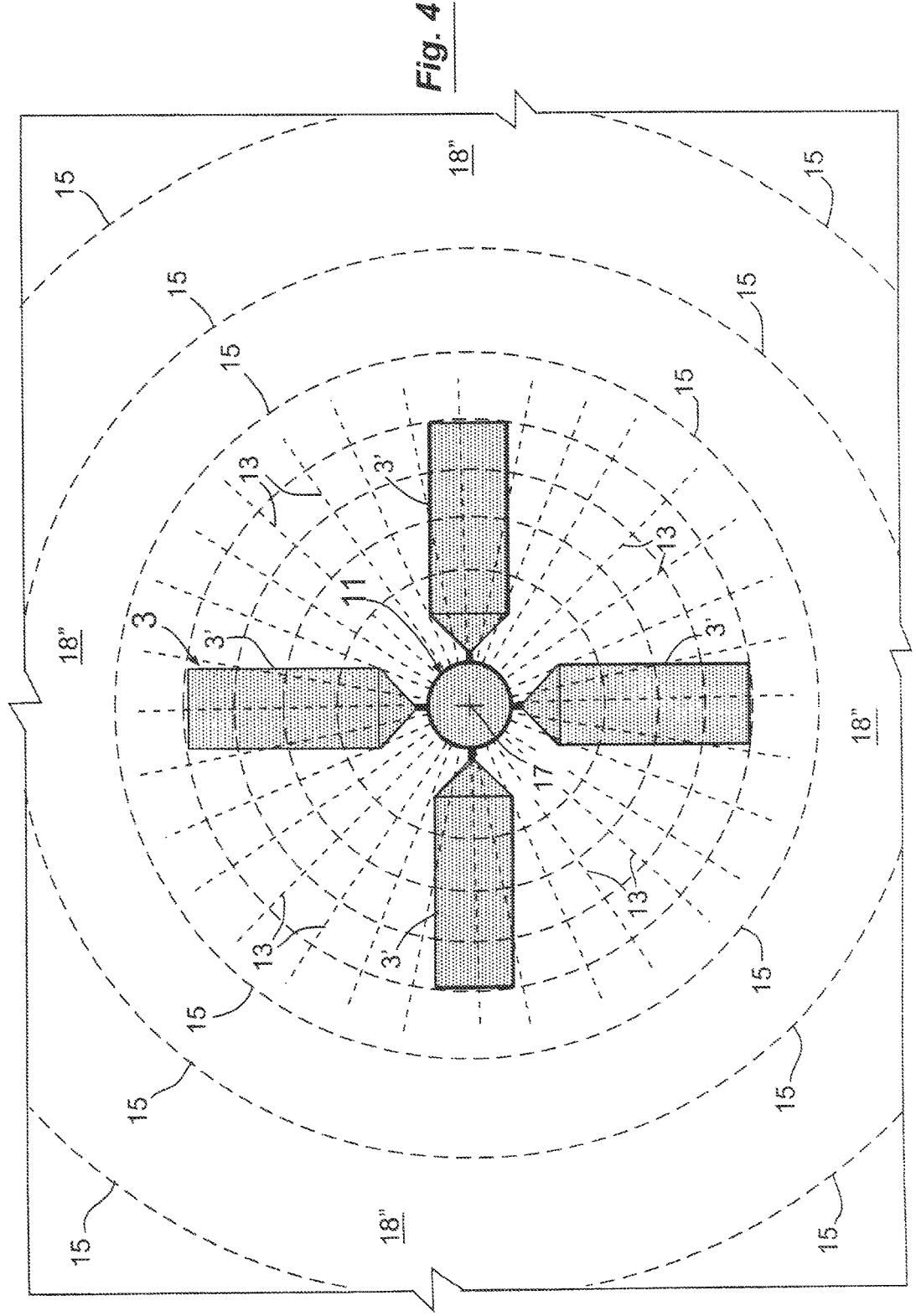
FIG. 4 is a top plan view taken along line 4-4 of FIG. 2 further illustrating the driving water pattern set up adjacent the surface of the tank water.

As schematically shown in FIG. 1, the present invention includes a water circulation system 1 having a flotation platform 3 with a draft tube 5 depending downwardly therefrom to the water inlet 7 of the draft tube 5 adjacent the floor 8 of the tank 2. In operation as best seen in FIGS. 2-3, the pump 9 positioned within the draft tube 5 in FIG. 2 draws up water 4' from substantially at the tank floor 8 (e.g., within a foot or so and preferably within six or fewer inches) into the inlet 7 of the draft tube 5 and up through the draft tube 5 to a spray nozzle 11. The spray nozzle 11 as shown in FIGS. 2-3 is supported by the flotation platform 3 above the water surface 18" of the remaining water 4" in the tank 2. The drawn-up water portion 4' through the draft tube 5 is then sprayed through the nozzle 11 at 13 in FIG. 2 outwardly and slightly downwardly toward the water surface 18". In doing so, a driving pattern or circulation 15 (see FIG. 3) is established in the remaining water 4" in the tank 2. This driving pattern 15 as illustrated in FIGS. 3 and 4 initially moves substantially radially outwardly from the nozzle 11 substantially 360 degrees about the vertical axis 17 at the water surface 18" (FIG. 4). The driving pattern 15 then continues outwardly toward the side walls 10 of the tank 2 (FIG. 3), downwardly along the side walls 10, radially inwardly across the tank floor 8 toward the inlet 7 of the draft tube 5, and up the draft tube 5. This driving pattern or circulation 15 in turn induces a secondary circulation pattern at 19 in FIG. 3 within the outer, driving pattern 15 to very effectively and thoroughly mix or blend all of the water in the entire tank 2. The inner or secondary circulation pattern 19 as shown in FIG. 3 passes up adjacent the outside of the draft tube 5 toward the water surface 18" and outwardly immediately beneath the upper flow 15 of the driving pattern to pass outwardly and downwardly within the driving pattern 15 and again up adjacent the draft tube 5.

Figure 5B:
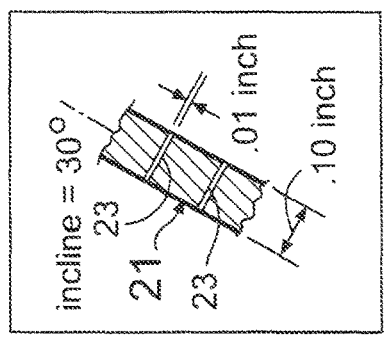
FIG. 5b is a further enlarged view of the perforations in the nozzle.
Figure 5A:
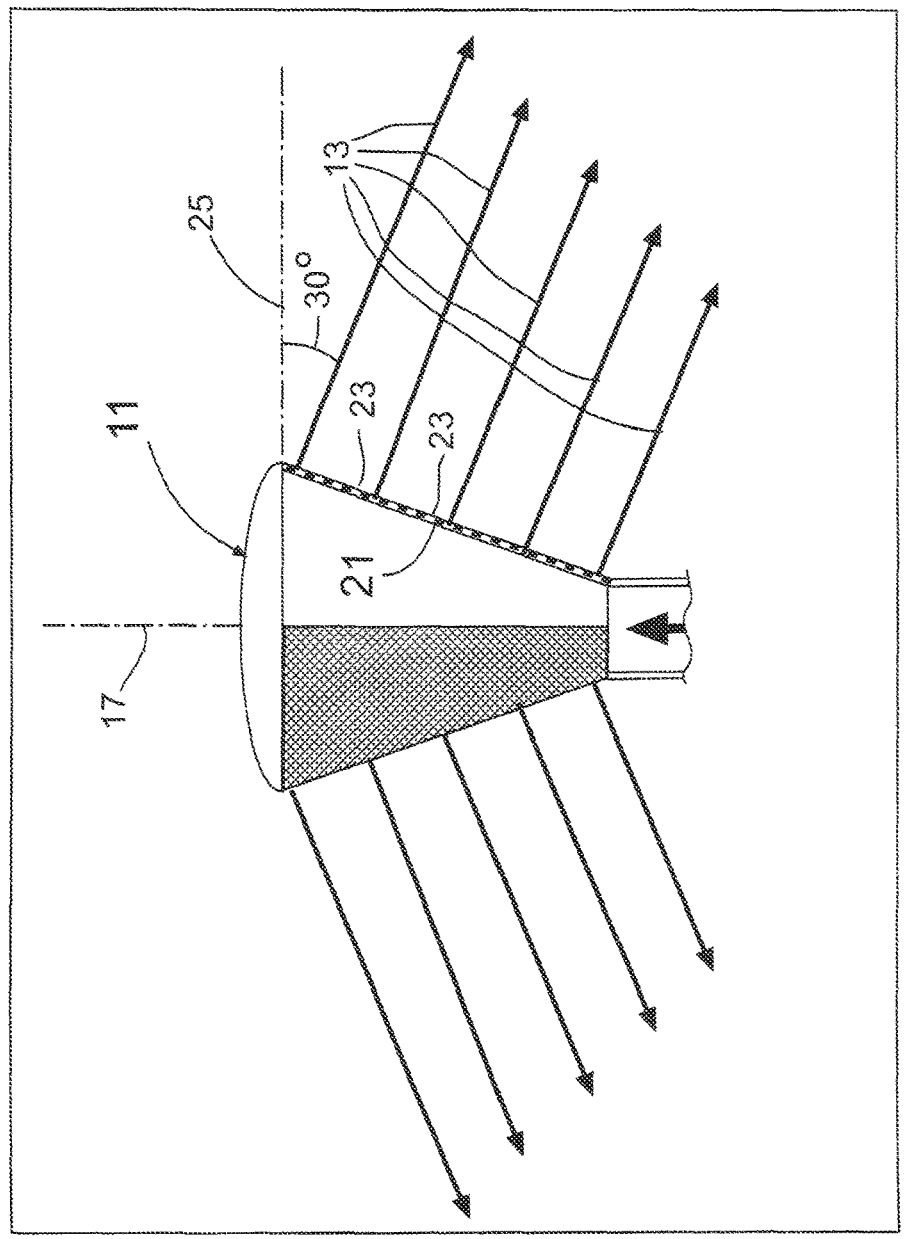
FIG. 5a is an enlarged, partial cross-sectional view of the nozzle at the top of the draft tube and the spray pattern it creates to produce the driven water pattern in the surface of the tank water.

The spray nozzle 11 of FIG. 5a is preferably a very thin (e.g., 0.1 inch) sheet 21 of stainless steel or similar material that has been pierced to create a large number (e.g., 5,000-30,000) of holes or perforations 23 on the order of 0.01 inches in diameter (FIG. 5b). The sheet 21 is then formed into an inverted, substantially conical or frustoconical shape about the vertical axis 17 (FIG. 5a). The apex area of the inverted cone is preferably about a foot above the water surface 18" of FIG. 3 and the height of the inverted cone itself from the apex to its base is preferably on the order of about 18 inches. The sides of the cone extend upwardly and outwardly of the vertical axis 17 on the order of 25 to 35 degrees. The pierced holes or perforations 23 are preferably directed outwardly about the vertical axis 17 and then slightly downwardly (e.g., 25 to 35 degrees and preferably about 30 degrees) from the horizontal 25 in FIG. 5a into the air gap region 20 (FIGS. 2-3) above the water surface 18". In doing so, the pierced holes 23 preferably create very fine streamlets or streamlines of water that will not only drive the circulating pattern 15 of FIG. 3 in the remaining water 4" but also allow space in between the streamlines for air as the streamlines in part (e.g., 50%) transition to propelled droplets and mist. The upper or higher streamlines 13 adjacent the inverted base of the cone of the nozzle 11 in FIGS. 2-4 extend out to or slightly beyond the floats 3' of the flotation platform 3 (FIG. 4) or roughly on the order of 3-6 feet outwardly from the vertical axis 17 (FIGS. 2-3) before striking the water surface 18". This in turn has been found to provide sufficient hang time for all of the streamlines 13 to be exposed to the air in the spray pattern to effectively treat or volatize the THM laden water. Empirically, in a tank 35 feet high and 100 feet in diameter holding about 2,000,000 gallons of water, it has been found that a pressure within the nozzle 11 of around 15-25 psi works very well in this regard. It is noted that although the water portion 4' is preferably drawn-up at a fairly high rate (e.g., 500 gallons per minute), the relative volume of this drawn-up water portion 4' per minute compared to the total volume of the tank (e.g., 2,000,000 gallons in a 35 foot high tank with a 100 foot diameter) is relatively small or less per minute than one thousandth of the total tank volume.

The present invention also includes an air flow system (FIG. 6) that creates an air flow pattern in the air gap region 20 above the water surface 18". This air flow system and air flow pattern are in addition to the above-described water circulation system 1 of FIG. 3 that creates the water flow patterns 15 and 19 in the water in the tank 2. The water and air flow systems interact and preferably actually intersect in the area of the spray pattern 13 from the nozzle 11 above the water surface 18" as in FIGS. 6-7. More specifically, the enclosed tank 2 of FIG. 6 is provided with an air fan or blower at 32. The blower 32 as shown draws in ambient, atmospheric air at 34, pressurizes it, and drives it down the depending hose 36 toward the water surface 18" and preferably directly into the spray pattern 13 from the nozzle 11. The end of the hose 36 is preferably adjacent the water surface 18" but still at a location closer to the ceiling 6 than the nozzle 11. The tank 2 is vented at 40 and the illustrated air flow pattern of FIG. 6 is then created from ambient, atmospheric air at 34 down the hose 36 into the air gap region 20 of the tank 2 and back out of the air gap region 20 through the air outlet 40 into the ambient, atmospheric air. Depending upon the size of the tank 2 and its air gap region 20, the air flow in cubic feet per minute is preferably on the order of 15-30 times (e.g., 20:1) the flow of the drawn-up portion of water 4' in cubic feet per minute. As for example and in a tank 35 feet high and 100 feet in diameter with an air gap region 20 extending 4-6 feet down from the tank ceiling 6 and a drawn up water portion 4' of 500 gallons per minute (roughly 70 cubic feet per minute), a desirable volume of air passing through the tank 2 would be on the order of 1400 cubic feet per minute. This would deliver an air volume enough to displace an air gap region 20 on the order of 6 feet high and 100 feet in diameter in our examples in about 30 minutes.

Figure 7:
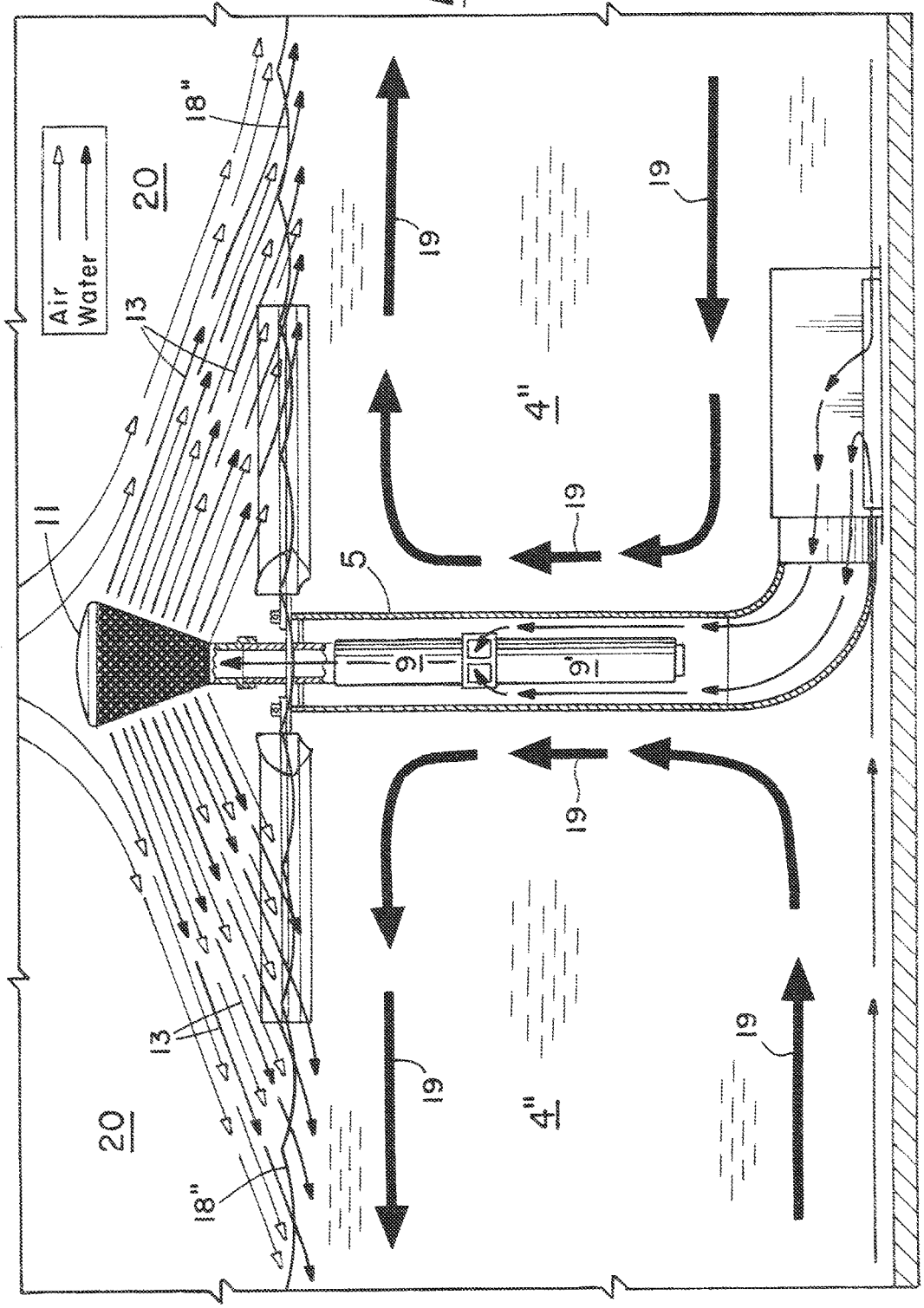
FIG. 7 is an enlarged view of the interaction of the water circulation system and air flow system of the present invention.

Such a high volume of change-out air is desirable to keep the air gap region 20 particularly near the nozzle spray pattern 13 and water surface 18" from becoming saturated with gaseous THM that might then condense and return to the water. Also, the volatilization process of the liquid state THM to gaseous state consumes heat from the air thereby reducing the air and water temperatures. The reduced temperatures in turn reduce the efficiency of the volatilization process wherein the preferred, relatively high air change-out rate then desirably adds heat to the air in the air gap region 20 to thereby increase the rate and efficiency of the volatilization process. Similarly, it is noted that the motor 9' for the pump 9 in FIGS. 2 and 7 is preferably positioned within the flow of the drawn-up water portion 4' in the draft tube 5. In this manner and on the one hand, the passing flow of 4' then cools the motor 9' and on the other hand, the passing flow of 4' is conversely and advantageously heated to aid in the subsequent volatilization process at the nozzle 11. The driving, air pressure differential (e.g., $\frac{1}{5}$-$\frac{1}{10}$ psi) between the tank inlet and outlet could also be created by reversing the flow through the blower 32 if desired but it is preferably created as illustrated in FIG. 6. Regardless and as mentioned above, the water and air flow patterns preferably actually intersect in the area of the spray pattern 13 from the nozzle 11 above the water surface 18" as perhaps best seen in FIG. 7. It is noted that the force of the water spray pattern 13 itself from the nozzle 11 into the air gap region 20 also aids in inducing the overall air currents in the tank 2 and in drawing air into the water spray pattern 13 itself and over the water surface 18".

In this manner, the volatizing or conversion of undesirable byproducts such as trihalomethanes (THM) from a liquid state in the tank water to a gaseous state in the air gap region 20 is greatly enhanced. That is and as perhaps best seen in FIG. 8, the THM in liquid or aqueous state resulting from the disinfectant process or processes discussed above is normally denser than water per se and tends to settle and concentrate in the tank water closest to the tank floor 8. This is the case whether the water is treated upstream of the tank 2 or actually in the tank 2. In either event, the water circulation system 1 of the present invention as explained above will then continuously draw up water laden with THM in liquid state from the depths of the tank 2 substantially at the tank floor 8 into the inlet 7 of the draft tube 5 and up through the draft tube 5 to a first location at the nozzle 11. This first location at the nozzle 11 as illustrated in FIGS. 2 and 3 is above the water surface 18" of the remaining water 4" in the tank 2 and the drawn-up water portion 4' (FIG. 3) through the draft tube 5 is thereafter sprayed into the air gap region 20 above the water surface 18" in a spray pattern 13. The spray pattern 13 as discussed above is substantially radially outwardly above the water surface 18" substantially 360 degrees about the vertical axis 17 of FIGS. 2-4 toward the side walls of the tank 2. The spray pattern 13 is also directly slightly downwardly (e.g., 30 degrees from the horizontal 25 as in FIG. 5a) toward the water surface 18" to create the driving flow pattern 15 of FIG. 3 in the tank water. In this embodiment, substantially all of the spray pattern is preferably directed downwardly to create as strong a driving pattern 15 as possible.

Figure 8:
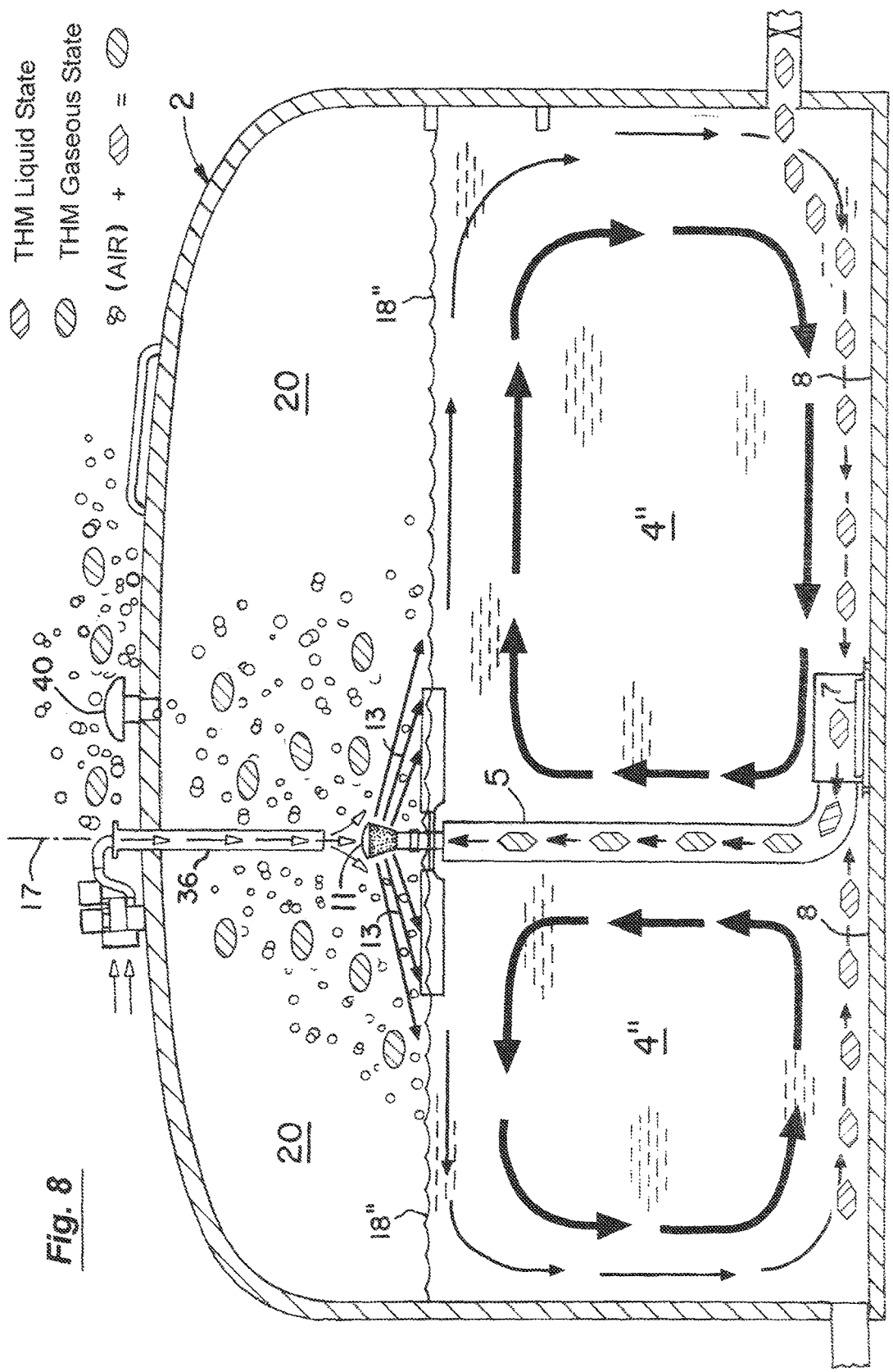
FIG. 8 illustrates the preferred embodiment in operation to volatize the undesirable byproducts such as trihalomethanes in liquid state in the water to a gaseous state and to remove them from the tank.
Figure 9:
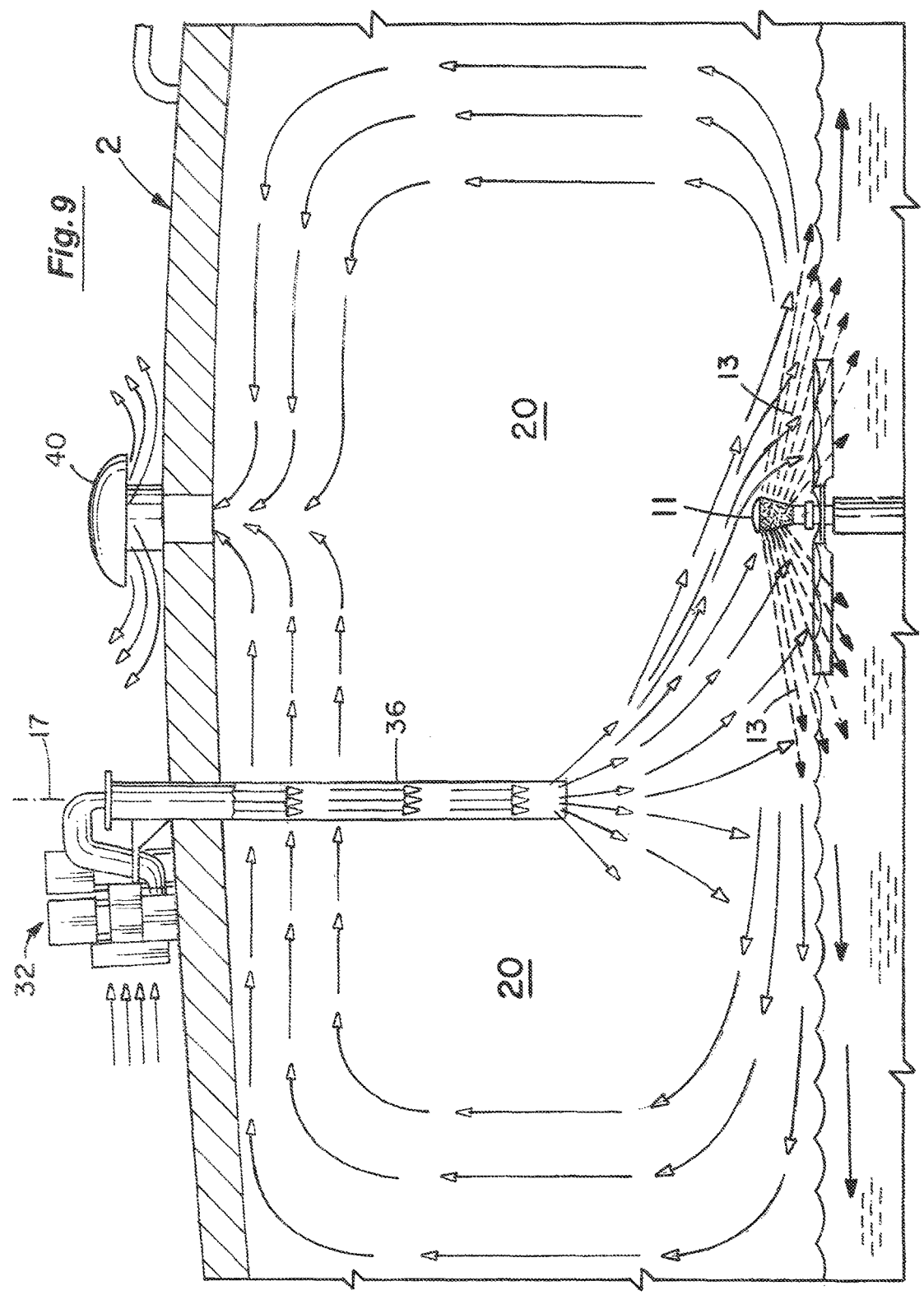
FIG. 9 is a view similar to FIG. 6 with the depending air hose and nozzle of the draft tube slightly misaligned but still operating in the desired manner of FIG. 6 to volatize and remove undesirable byproducts such as trihalomethanes from the tank water.

The discharge of pressurized, ambient air exiting the hose 36 in FIG. 8 is then preferably directed downwardly as also discussed above along the vertical axis 17 into the spray pattern 13 from the nozzle 11 to greatly enhance the contact and volatizing of the THM in liquid state to THM in gaseous state. The THM in gaseous state then enters the rest of the air flow pattern as in FIG. 8 and exits with the air flow out the vent 40 into the ambient air. Although the discharged air from the hose 36 is preferably directly downwardly along and about the vertical axis 17 directly and uniformly into the spray pattern 13 from the nozzle 11 as illustrated in FIG. 8, enhanced contact and volatizing of the THM in liquid state with the air in the air gap region 20 will also occur even if the hose 36 and nozzle 11 are slightly misaligned as in FIG. 9. Such misalignment can occur as a result of the initial setup or due to the flotation platform and nozzle 11 moving laterally as the water level rises or falls in the tank 2. Regardless, the enhanced contact and volatizing will occur to at least a certain extent with even just at least a portion of the discharged air from the hose 36 directed toward and into the nozzle spray pattern 13 as in FIG. 9. In both the aligned and misalignment positions, the discharged air exits the hose 36 relatively close to the water surface 18" and will also move outwardly adjacent the surface 18" toward the tank walls 10 to help volatize and entrain gaseous THM in the overall air flow pattern.

It is noted that the water circulation system 1 of the present invention is a paramount feature. This is the case particularly as the system 1 draws up water essentially at the tank floor 8 (e.g., within a foot or so and preferably within six or fewer inches) as in FIGS. 2-3 and establishes the primary or driving circulation pattern 15 (FIG. 3) and the induced secondary or inner circulation pattern 19 that effectively and thoroughly mix or blend the water in the entire tank 2. In doing so, the water circulation system 1 results in virtually all of the tank water in a relatively short period (e.g., 1-2 days in the 2,000,000 gallon tank of our examples) being passed through and treated in the relatively small area (e.g., 6-12 feet wide and 30 inches high) of the substantially conical spray pattern 13 from the nozzle 11. This is in contrast to other systems that do not have such a localized treatment area and need to have treatment zones virtually throughout the entire tank to ensure proper treatment. It is also in contrast to many prior art systems in which the water being sprayed and treated is only from a very limited area in the tank often just in the immediate vicinity of the pump. The same relatively small amount of water adjacent the pump is then just continually recycled leaving the rest of the water untreated. Further, if the drawn up water is not essentially from right off the tank floor (e.g., twelve inches or fewer), the denser THM may simply pass into and out of the tank along the tank floor 8 in the configuration of FIG. 3 without being treated at all. In comparison, the water circulation system 1 of the present invention as discussed above not only draws up water essentially at and across the entire tank floor 8 but also establishes a complete circulation throughout the tank with few if any dead spots where THM might undesirably concentrate. Monitoring samples for THM concentrations can then be taken essentially anywhere in the tank 2 with the confidence that the readings will accurately reflect the THM concentrations everywhere in the tank 2. The fresh air flow system is equally important to the present invention as it virtually eliminates the undesirable situation that volatized THM will saturate the air in the air gap region 20 with the gaseous THM then undesirably condensing and returning to the water.

Figure 10:
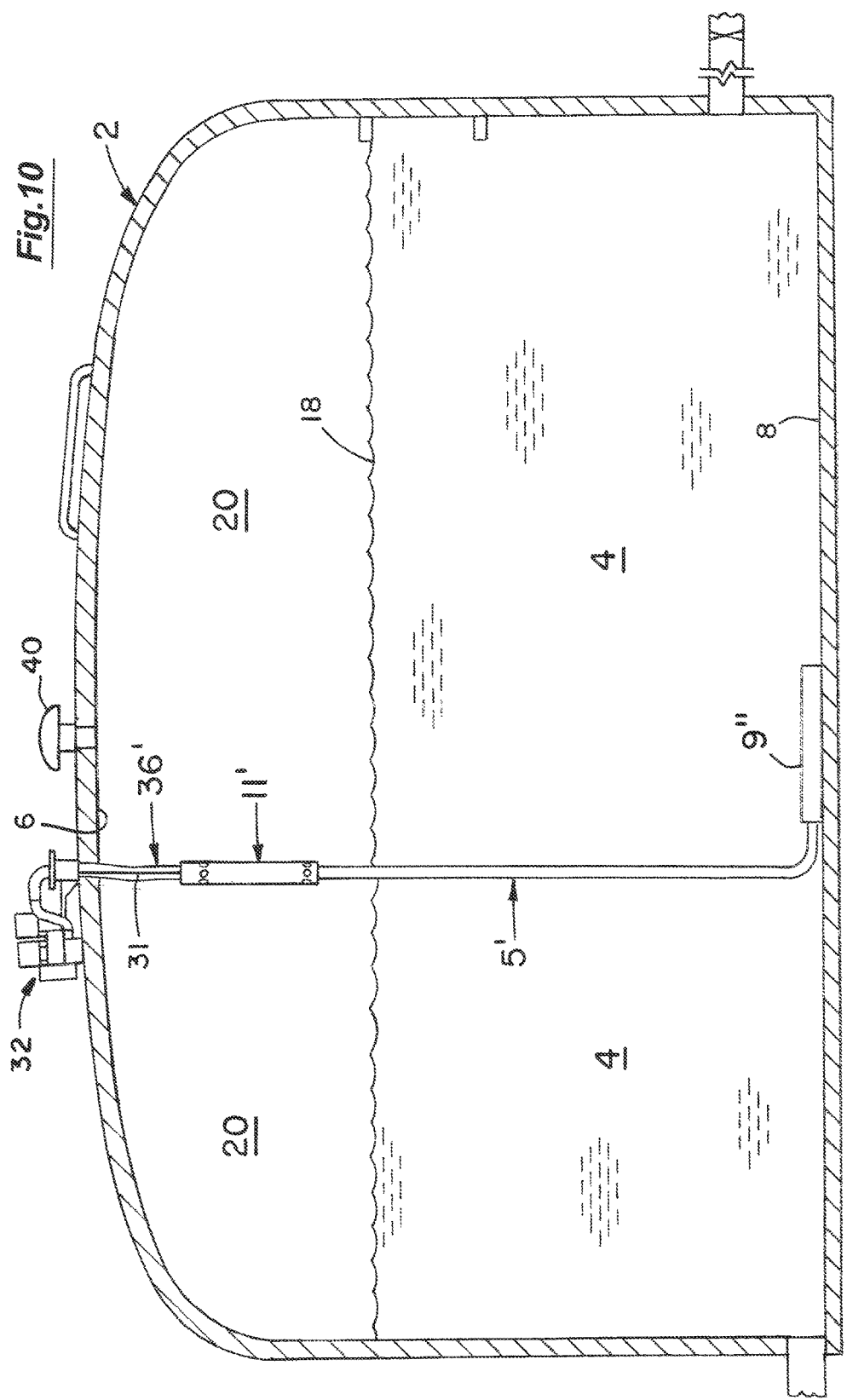
FIG. 10 illustrates a second embodiment of the present invention.
Figure 11:
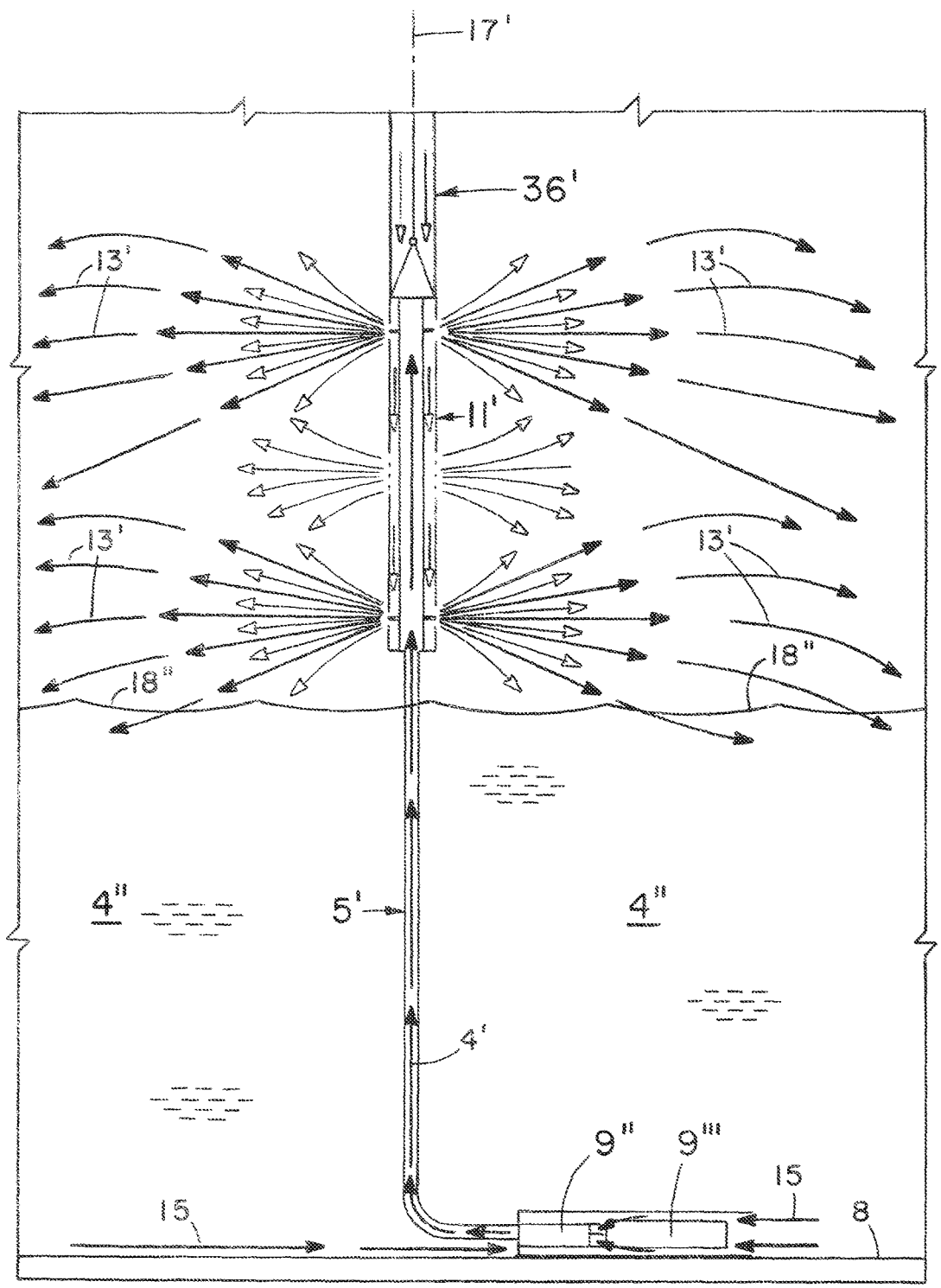
FIG. 11 is an enlarged view of the nozzle of the second embodiment.

It is also noted that the flotation platform 3 of FIGS. 2-4 with the draft tube 5 depending therefrom and the nozzle 11 supported thereon is preferred. This is the case because the pump 9 of FIG. 7 is then always at a predetermined, fixed depth or distance below the water surface 18" as the tank water level rises or falls. Conversely, the nozzle 11 is always at a predetermined, fixed distance or location above the water surface 18". In this manner, the operating parameters of this embodiment including the power requirements of the motor 9' for the pump 9 can best be designed and optimized for highest efficiency and safety to the various parts of the water circulation system and the air flow system of the present invention. Although the embodiment of FIG. 1-9 is preferred, the driving pump (see 9" in FIGS. 10-11) could also be positioned on the tank floor 8 if desired and the nozzle (11' in FIGS. 10-11) suspended at a predetermined, fixed location from the tank ceiling 6 as the water surface 18 (FIG. 10) may vary by rising or falling. The motor 9''' for the pump 9" in FIG. 11 as is the case with motor 9' for the pump 9 in FIG. 2 of the first embodiment can be powered by an electrical cord 31 (FIG. 10) dropping down through or adjacent the air hose 36', which power cord 31 is only shown in FIG. 10 for clarity. Additionally, the motor 9''' in the embodiment of FIG. 10 like the motor 9' in the first embodiment is preferably positioned within the flow of the water portion 4'. As discussed above and on the one hand, the passing flow of 4' then cools the motor 9''' and on the other hand, the passing flow of 4' is conversely and advantageously heated to aid in the subsequent volatilization process at the nozzle 11'.

The modified nozzle 11' as shown in FIGS. 12a and 12b includes the upcoming water tube 5' that is concentrically surrounded by the lower extension 36" of the depending air hose 36'. A plurality of radially spaced nozzles 11" are then provided at upper and lower levels on the water tube 5' and the surrounding extension 36" provided with perforated air holes 23' above and below the nozzles 11" as shown in FIGS. 12a-12b. The spray pattern 13' of FIG. 11 from the nozzle 11' differs from nozzle 11 of the preferred embodiment of FIGS. 1-9 but still has a component directed radially outwardly substantially 360 degrees about the vertical axis 17' and slightly downwardly toward the water surface 18" to create a water driving pattern like 15 in FIG. 3. Similarly, the pressurized air discharged through the perforated air holes 23' creates an air flow pattern in the air gap region 20 in part like the air flow pattern illustrated in FIG. 6. To a certain extent, the choice between the embodiments of FIGS. 1-9 and 10-12b depends upon the size of the access opening to the tank with the first embodiment normally requiring a larger one (e.g., 18 inches or more).

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the undesirable byproducts to be treated by the present invention have been primarily described as being trihalomethanes (THM) resulting from disinfecting processes that use chlorine and chloramines. Such THM exist in liquid state in the processed water and have a relatively high vapor pressure while having a relatively low aqueous solubility. Consequently, THM in liquid state in water easily and quickly volatizes to a gaseous state when exposed to air. However, the method and apparatus of the present invention are meant to equally encompass treating similar byproducts from other disinfecting processes in which the processed water has undesirable byproducts with similar properties to THM including a relatively high vapor pressure so it easily and quickly volatizes into air. It is also noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

We claim:

1. Apparatus for treating water laden with undesirable disinfectant byproducts including trihalomethanes (THM) in liquid state collected in an enclosed tank having a ceiling, floor, and side walls extending between the ceiling and floor to contain the water therein with the surface of the water spaced at least a first distance below the ceiling of the tank to create an air gap region between the ceiling and the surface of the water therebelow, the apparatus including:

a water circulation system including a draft tube having an inlet positioned below the surface of the water in the tank and an outlet at a first location below the tank ceiling less than the first distance the surface of the water is spaced below the ceiling of the tank wherein the outlet of the draft tube at said first location is above the surface of the water in the tank, said draft tube at said first location having a nozzle and said apparatus further including a pump to move a portion of the water from below the surface of the water in the tank into the draft tube inlet positioned below the surface of the water in the tank, up through said draft tube to said first location positioned above the surface of the water in the tank, and out said nozzle in a spray pattern above the surface of the remaining water in the tank directed outwardly of and about a vertical axis toward the tank side walls and with at least a portion of said spray pattern above the surface of the remaining water in the tank being positively directed by said nozzle slightly downwardly toward the surface of the remaining water in the tank to aid in creating a circulation pattern in the remaining water laden with THM in said tank radially outwardly of and about said vertical axis adjacent the surface of the remaining water in the tank toward said tank side walls, downwardly along the tank side walls, and inwardly across the floor toward the inlet to the draft tube with said portion thereof upwardly moved through said draft tube to said first location above the surface of the remaining water in the tank and sprayed outwardly into said air gap region above the surface of the remaining water in the tank toward the surface of the remaining water wherein the upwardly moved water portion laden with THM sprayed into the air gap region is exposed to the air in said air gap region and the THM in liquid state therein volatized by the air exposure to a gaseous state in said air gap region and said tank having an air inlet and an air outlet and an air flow system for creating a continuous air flow pattern directed above and across the surface of the remaining water in the tank from ambient, atmospheric air outside of the tank continuously through the tank from said air inlet in the tank into the air gap region above the surface of the remaining water in the tank and back out of the air gap region above the surface of the remaining water in the tank through said air outlet in the tank into the ambient, atmospheric air, said air flow system including a blower to establish a direct pressure differential in the air in the air gap region above the surface of the remaining water in the tank between the air inlet and the air outlet of the tank and further including a hose depending downwardly of the tank ceiling to direct at least a portion of said air flow pattern downwardly toward and into the spray pattern of the upwardly moved water portion above the surface of the remaining water in the tank wherein the THM in liquid state upwardly moved through the draft tube and volatized to gaseous state in the air gap region above the surface of the remaining water in the tank enters the air flow pattern in the tank above the surface of the remaining water in the tank and exits the tank with the air flow pattern through the air outlet of the tank.

2. The apparatus of claim 1 wherein the water circulation system further includes a flotation platform supporting said draft tube thereon with the first location of the outlet of the draft tube at a predetermined distance above the surface of the water in the tank.

3. The apparatus of claim 2 wherein said nozzle is a thin sheet of material formed about the vertical axis in the shape of an inverted cone.

4. The apparatus of claim 2 wherein said nozzle is a perforated sheet configured in an inverted, substantially conical shape with the sides of the cone inclined upwardly and outwardly relative to the vertical axis and the perforations directed downwardly from the horizontal toward the surface of the remaining water in the tank.

5. The apparatus of claim 4 wherein said perforations are directed downwardly between 25 and 35 degrees to the horizontal.

6. The apparatus of claim 4 wherein the sheet is about 0.1 inches thick and has between 5,000 and 30,000 perforations therethrough of about 0.01 inches in diameter.

7. The apparatus of claim 2 wherein the inlet to the draft tube is supported less than a foot from the tank floor.

8. The apparatus of claim 2 wherein the pump is driven by a motor positioned in the draft tube in the water portion upwardly moved through the draft tube by the pump wherein the water portion upwardly moved through the draft tube by the pump cools the motor and the water portion upwardly moved through the draft tube by the pump is conversely heated to aid in the rate and efficiency of the subsequent volatilization of the THM.

9. The apparatus of claim 2 wherein said hose depends downwardly substantially along and about said vertical axis of said spray pattern and has a discharge end spaced above the surface of the water in the tank.

10. The apparatus of claim 2 wherein said hose depends downwardly to a second location closer to said tank ceiling than said first location of the outlet of said draft tube and above the surface of the water in the tank.

11. The apparatus of claim 1 wherein the first location of the outlet of said draft tube is at a predetermined, fixed distance below the ceiling of the tank.

12. The apparatus of claim 1 wherein said hose includes a perforated portion substantially concentrically surrounding said draft tube substantially at said first location.

13. The apparatus of claim 1 wherein all of the spray pattern is positively directed by a structural portion of said nozzle slightly downwardly toward the surface of the remaining water in the tank to aid in creating said circulation pattern in the water.

14. The apparatus of claim 1 wherein at least three-fourths of the spray pattern is positively directed by a structural portion of said nozzle slightly downwardly toward the surface of the remaining water in the tank to aid in creating said circulation pattern in the water.

15. The apparatus of claim 1 wherein at least half of the spray pattern is positively directed by a structural portion of said nozzle slightly downwardly toward the surface of the remaining water in the tank to aid in creating said circulation pattern in the water.

16. The apparatus of claim 1 wherein at least a third of the spray pattern is positively directed by a structural portion of said nozzle slightly downwardly toward the surface of the remaining water in the tank to aid in creating said circulation pattern in the water.

17. The apparatus of claim 1 wherein the spray pattern from said nozzle is directed 360 degrees outwardly of and about said vertical axis toward the tank side walls.

18. The apparatus of claim 1 wherein said portion of said spray pattern directed slightly downwardly toward the surface of the remaining water in the tank to aid in creating said circulation pattern in the water laden with THM in said tank is directed outwardly 360 degrees of and about said vertical axis adjacent said surface toward said tank side walls.

* * * * *